(12) United States Patent
Teratani

(10) Patent No.: US 7,572,074 B2
(45) Date of Patent: Aug. 11, 2009

(54) CAMERA MOUNTING DEVICE

(75) Inventor: Kazumi Teratani, Osaka (JP)

(73) Assignee: Panasonic Corporation, Osaka (JP)

( * ) Notice: Subject to any disclaimer, the term of this patent is extended or adjusted under 35 U.S.C. 154(b) by 372 days.

(21) Appl. No.: 11/645,543

(22) Filed: Dec. 27, 2006

(65) Prior Publication Data

US 2007/0147829 A1    Jun. 28, 2007

(30) Foreign Application Priority Data

Dec. 28, 2005  (JP) .............................. 2005-377930
Jan. 17, 2006  (JP) .............................. 2006-008439

(51) Int. Cl.
*G03B 17/00* (2006.01)
(52) U.S. Cl. ................. 396/428; 396/419; 348/373; 348/376; 248/181.1; 248/187.1
(58) Field of Classification Search ............... 396/419, 396/428; 348/373, 376; D16/242, 244; 248/181.1, 248/187.1
See application file for complete search history.

(56) References Cited

U.S. PATENT DOCUMENTS 3,733,042 A * 5/1973 Jungjohann et al. ...... 248/181.1

6,196,504 B1 *  3/2001  Lemke ..................... 248/187.1
7,380,996 B2 *  6/2008  Kouchi et al. ............... 396/424
2005/0041966 A1 *  2/2005  Johnson ....................... 396/428
2007/0212057 A1 *  9/2007  Liang .......................... 396/428

FOREIGN PATENT DOCUMENTS

JP        10288811 A     10/1998

* cited by examiner

*Primary Examiner*—W. B. Perkey
*Assistant Examiner*—Warren K Fenwick
(74) *Attorney, Agent, or Firm*—Steptoe & Johnson LLP

(57) ABSTRACT

A camera-mounting device is provided that is inexpensive and resistive to vibration, and can generate a large coupling force with a small operation force. The camera-mounting device includes a ball shaft, a case main body provided with a ball-shaft receiver, a press plate that allows the ball shaft to be pressed onto the ball-shaft receiver and a cam that presses the press plate in a direction toward the ball shaft by a rotation of a lever, and in this structure, the rotation of the lever is made to have a multiplied force through the principle of the lever to push the press plate down so that the cam and a cam contact face are made in contact with each other on a flat face. With this arrangement, a large coupling force is generated by a small force so that the device is made resistive to vibration.

5 Claims, 8 Drawing Sheets

CAMERA MOUNTING DEVICE

BACKGROUND OF THE INVENTION (1) Field of the Invention

The present invention relates to a camera-mounting device that is used for attaching, for example, a monitor camera or the like to a ceiling above a front glass of a mobile body such as a car in a suspended state.

(2) Description of the Related Art

In a conventional camera-mounting device, securing and releasing mechanisms (mainly, screws) are placed near a rotation ball shaft so as to firmly secure a camera mounted on a—(for example, see Japanese Unexamined Patent Publication 10-288811). FIGS. 9 and 10 show a conventional camera-mounting device described in the Patent Publication.

FIG. 9 is an exploded perspective view showing one portion of a case main body, and FIG. 10 is a longitudinal cross-sectional view. This camera-mounting device has a structure in which a mount base 121 having a truncated cone shape with a cone face 122 being formed on its upper portion is installed on the bottom of a cylindrical case main body 101, and a belt-shaped tightening mechanism 131 having a handle 141 is placed on the upper portion of this mount base 121. Moreover, a ball shaft 111 having a spherical shape is mounted on the upper portion of the tightening mechanism 131. Cone faces 132 and 133 are formed on the upper and lower inner faces of the ring portion of the tightening mechanism 131, and the cone face 133 on the lower side and the cone face 122 of the mount base 121 are made in contact with each other, with the ball shaft 111 having a spherical shape being mounted on the cone face 132 on the upper side. Here, the upper portion of the ball shaft 111 is made in contact with the inner face of the upper portion of the case main body 101.

In the above-mentioned structure, when the handle 141 is rotated in a securing direction, the tightening mechanism 131 is tightened inward by functions of the handle 141 and the screw shaft 142 so that the ring portion of the tightening mechanism 131 is allowed to intrude between the ball shaft 111 and the mount base 121. Since the ball shaft 111, the tightening mechanism 131 and the mount base 121 are placed in the case main body 101 without any gap, the ball shaft 111 is raised by tilt vectors exerted on the cone faces 132 and 133 formed on the upper and lower ends of the tightening mechanism, the cone face 122 of the mount base 121 and the ball shaft 111, so as to be firmly pressed onto the inner face of the upper portion of the case main body 101 so that the ball shaft 111 is secured onto the case main body 101.

In the above-mentioned conventional structure, however, in the case of poor machining precision of parts, the ball shaft 111 fails to obtain a sufficient holding strength to the case main body 101. For this reason, a special machining process is required for manufacturing the tilt face to cause the parts to become expensive. Moreover, since the securing and releasing operations for the ball shaft 111 are carried out by the screw shaft 142 of the handle 141, the screw tends to become loose due to vibration when installed in a mobile body such as a vehicle, resulting in a problem of degradation in the securing force.

In order to solve these problems, the objective of the present invention is to provide a camera-mounting device that exerts a firm securing force, and is resistive to vibration.

SUMMARY OF THE INVENTION

In order to solve the above-mentioned conventional problems, the camera-mounting device of the present invention is provided with a ball shaft having a ball portion and a shaft portion, a case main body provided with a ball-shaft receiver that holds the ball portion of the ball shaft, a press plate that allows the ball shaft to be pressed onto the ball-shaft receiver and a cam that presses the press plate in a direction toward the ball shaft by a rotation of a lever, and in this structure, the cam has a first flat portion and a second flat portion that has a distance longer from the rotation center of the cam in comparison with the first flat portion, and when the first flat portion of the cam is allowed to press the press plate through the rotation of the lever, the press plate is not allowed to press the ball shaft, while, when the second flat portion of the cam is allowed to press the press plate through the rotation of the lever, the press plate is allowed to press the ball shaft so that the ball shaft is sandwiched between the ball-shaft receiver and the press plate to be secured between them.

In accordance with the camera-mounting device of the present invention, the rotation of the lever is made to have a multiplied force through the principle of the lever to push the press plate down so that the cam and a cam contact face are made in contact with each other on a flat portion; thus, a large coupling force is generated by a small force so that it becomes possible to achieve a firm securing operation that is resistive to vibration by using inexpensive parts, through one-hand operations.

DESCRIPTION OF THE PREFERRED EMBODIMENTS

Referring to Figures, the following description will discuss preferred embodiments of the present invention. In these embodiments, explanations will be given by exemplifying a camera-mounting device used for securing a monitor camera for vehicles into a vehicle; however, the camera-mounting device of the present invention is not intended to be limited only by those devices used for vehicles, and may be used for trains, airplanes, ships and the like, as well as for such an application as to securing a camera to a pillar, a wall or the like in a building, and the application is not intended to be specifically limited to a narrow range.

First Embodiment

Figure 1:
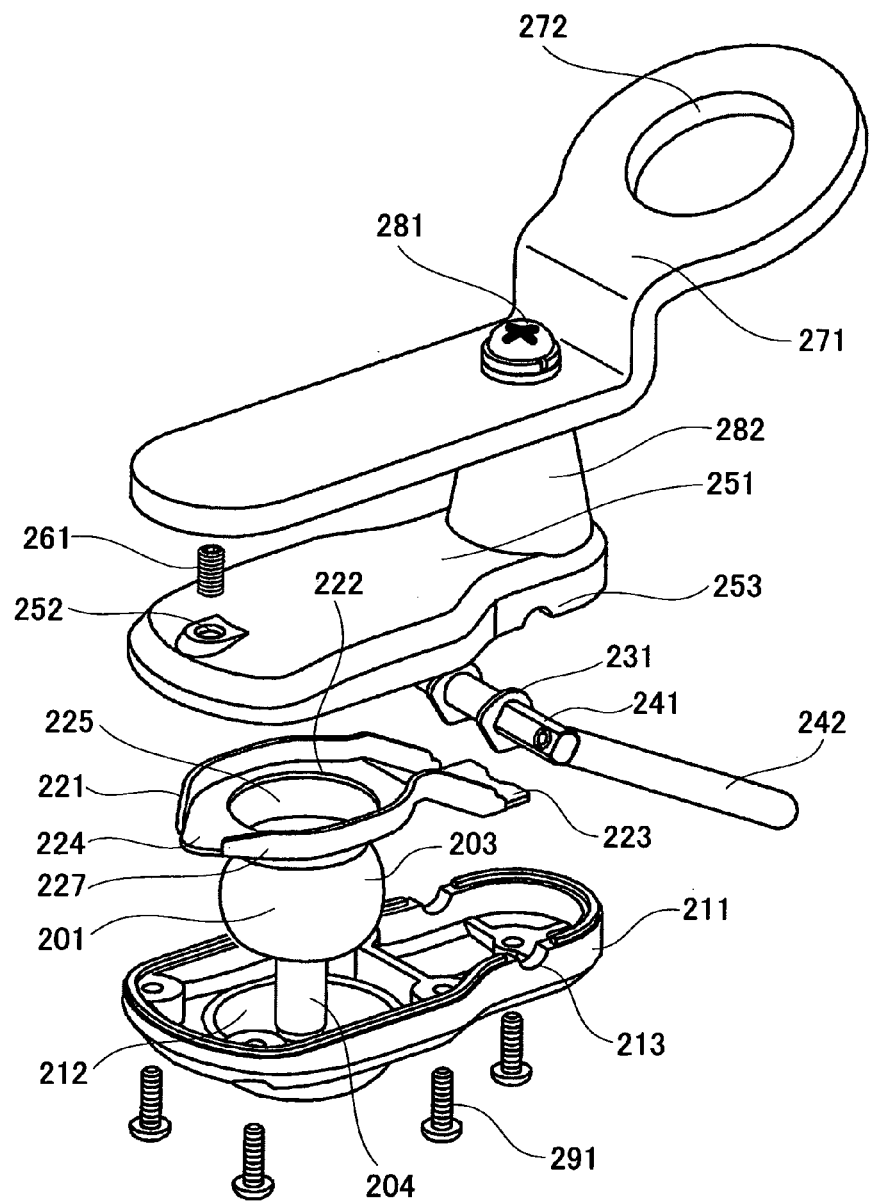
FIG. 1 is a structural drawing that shows parts of a camera-mounting device in accordance with a first embodiment of the present invention.

FIG. 1 is a structural drawing (exploded perspective view) that shows parts of a camera-mounting device in accordance with a first embodiment of the present invention.

A casing of the main body portion of this camera-mounting device is constituted by a case main body 211 having a virtually elliptical shape and a lid member 251 that covers the upper portion of this case main body 211 so that the case main body 211 is covered with the lid member 251, with a shallow housing space being prepared therein. The lid member 215 is secured to the case main body 211 with securing screws 291. A ball shaft receiver 212 having a bowl shape is formed on the front portion of the case main body 211 so as to support the ball shaft 201.

The ball shaft 201 is constituted by a ball portion 203 having a shape in which the top portion of a spherical body is cut off and a shaft portion 204 that extends downward from the bottom of the ball portion 203. The ball shaft 201 is supported onto a ball shaft receiver 212 formed on the case main body 211 to be allowed to pivot thereon, with the ball portion 203 being pressed by a ball shaft pressing portion 222 located on the periphery of a round hole 225 of a press plate 221 from above, so that it is secured in the case main body 211. Here, the top portion of the ball portion 203 is cut off so as to make the thickness of the casing thinner.

In the press plate 221, the ring-shaped ball shaft pressing portion 222 having the round hole 225 as described above and a slanting portion 226 that extends rearward from the rear end edge of the ball shaft pressing portion 222 are allowed to protrude in a manner so as to tilt downward, with a cam-contact face 223 further sticking out from the slanting portion 226 horizontally. The cam-contact face 223 at the rear end of the press plate 221 is placed at a position to be made in contact with a cam 231 formed on a lever shaft 241 (hereinafter, referred to simply as a cam, and the cam will be described later in detail), and this cam-contact face 223 is pressed downward by the cam 231. Moreover, a screw contact point 224 is formed at the tip portion of the press plate 221, that is, at a position on the side opposing to the cam-contact face 223 with the ball shaft pressing portion 222 located in between. This contact point 224 is formed by a triangular member sticking out forward from the ball shaft pressing portion 222, and this member serves as the contact point 224. Moreover, reinforcing ribs 227 are formed on the two sides of the press plate 221. In the present embodiment, the press plate 221 is formed through a single squeezing technique by using a stainless steel plate for springs.

The lever 242 is coupled to one end of the lever shaft 241 in which the cam 231 is formed with screws (not shown). The rotation of the lever 242 is transmitted to the cam 231 through the lever shaft 241 so that the cam 231 is allowed to rotate. The lever shaft 241 is sandwiched and supported by bearings 213 and 253 that are respectively formed by cutting the side edges of the case main body 211 and the lid member 251 into a semi-circular shape so as to be allowed to rotate thereon.

The lid member 251 is provided with an adjusting screw hole 252 at a position facing the screw contact point 224, and an adjusting screw 261 is screwed therein. By the rotation of the adjusting screw 261, the screw contact point 224 is pressed downward or slackened so that it is placed in a manner capable of shifting upward as well as downward.

Figure 2:
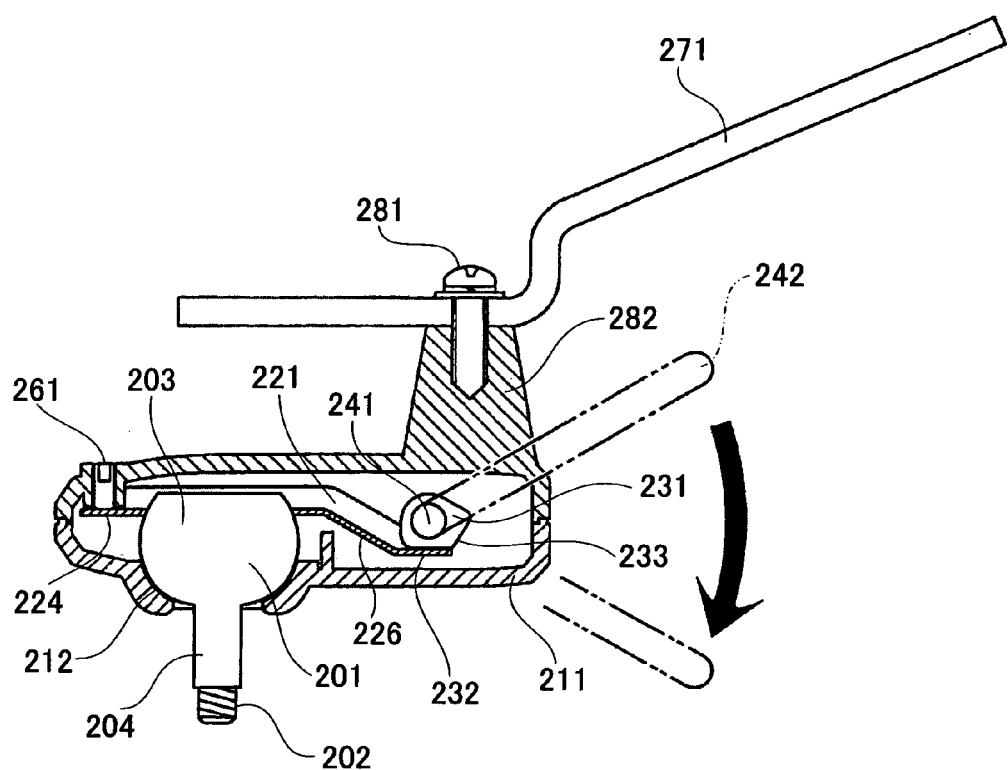
FIG. 2 is a cross-sectional view showing the camera-mounting device in accordance with the first embodiment of the present invention.

An attaching member 271 is bent into a spoon shape with an attaching hole 272 being formed in the center of a round portion on the rear end portion. By using this attaching hole 272, the member is secured to a car body by being co-fastened onto a sun visor hook (not shown). Moreover, the entire camera-mounting device is designed to be suspended by a securing screw 281 through a supporting pillar 282 having a truncated cone shape. Referring to FIG. 2, the following description will discuss functions of the camera-mounting device having the above-mentioned structure in the embodiment of the present invention.

FIG. 2 is a cross-sectional view that shows a camera-mounting device in accordance with the first embodiment of the present invention, from which securing screws 291 and screw holes are omitted for convenience of explanation. In FIG. 2, two flat portions, that is, a first flat portion 232 and a second flat portion 233, are formed on a cam 231 in a manner so as to form a blunt angle. The distance between the second flat portion 233 and the rotation center of the lever shaft 241 is made longer than the distance between the first flat portion 232 and the rotation center of the lever shaft 241.

In FIG. 2, the cam 231 is located at a slackening position, with the cam 231 being made in contact with the cam contact face 223 at the first flat portion 232. At this time, the press plate 221 is in a state in which it does not press the ball shaft 201, that is, the pressing force is set to 0. For this reason, the ball shaft 201, supported by the ball shaft receiver 212, is not restrained in movements of the ball portion 203 by the ball shaft pressing portion 222 of the press plate 221 so that it is allowed to move with a predetermined angle. For this reason, it is possible to change the image-pickup angle of a camera 301 attached to the shaft portion 204 of the ball shaft 201.

Next, when the lever 242 is made to pivot from the slackening position shown in FIG. 2 to a tightening position in an arrow direction, the cam 231 is made in contact with the cam contact face 223 at the second flat portion 233. Since the second flat portion 233 is farther from the rotation center of the lever shaft 241 in comparison with the first flat portion 232, the cam 231 is allowed to have a doubled force through the principle of the lever, and presses the cam-contact face 223 of the press plate 221 downward.

The cam 231 has its cam-contact face 223 made in contact with any one of the flat portions, that is, the first flat portion 232 and the second flat portion 233; therefore, upon contacting at a position other than the slackening position and the tightening position, the cam 231 is pushed back to any one of the positions by a repulsive force of the press plate 221. For this reason, the lever 242 is allowed to be positioned only at the two positions, that is, the slackening position and the tightening position. Moreover, the repulsive force is applied to the cam 231, with the cam contact face 223 being made in contact with the flat portion of the cam 231, so that the layer 242 is restrained from its rotation, and prevented from being slackened by vibrations or the like of the car, which makes this structure different from a simple screw securing. The deformation and shifts of the contact member caused by the cam 231, as well as the multiplied force by the lever function, are prior art techniques; therefore, the description thereof is omitted.

The press plate 221, thus pushed down, has its contact point 224 at which it is made in contact with the adjusting screw 261 as a fulcrum, its cam-contact face 223 as a force application point and its ball shaft pressing portion 222 as an action point, and simultaneously as the ball shaft pressing portion 222 presses the ball portion 203 of the ball shaft 201 through the lever function, the ball shaft 201 is pressed onto the ball shaft receiver 212 so that the ball shaft 201 is firmly secured to the case main body 211. In this first embodiment, by using a multiplied force of 1.8 times in the press plate 221 as well as by using a multiplied force of 9.3 times in the lever 242 and the cam 231, a multiplied force of 16.7 times in total is used to carry out a securing process; thus, by using a light operation of the lever 242, it becomes possible to achieve a firm securing operation. In this manner, the camera-mounting device of the present invention makes it possible to carry out slackening and tightening operations of the ball shaft 201 by switching the slackening position and the tightening position of the lever.

Here, by adjusting the up and down position of the adjusting screw 261, as well as by changing the position at which the adjusting screw 261 is made in contact with the screw contact point 224, the position of the fulcrum is changed so that the securing force to be applied when the lever 242 is placed at the tightening position can be adjusted.

Next, referring to FIG. 2, the following description will discuss that the present invention makes it possible to eliminate the necessity of high precision machining with respect to the parts. Even in the case when a deviation occurs in any of the diameter of the ball portion 203 of the ball shaft 201, the diameter of the spherical face of the ball shaft receiver 212 and the diameter of the round hole 225 of the ball shaft pressing portion 222, since the contact portion between the individual parts is formed by a spherical shape and a circle, by shifting the fulcrum with the adjusting screw 261 rotated, the cam contact face 223 and the position of the cam 231 can be easily corrected. Moreover, although the two positions of the slackening position and the tightening position are prepared in the present invention, it is possible to apply a pre-pressure to the press plate 221 by the adjusting screw 261 so that the ball shaft 201 may be made to have a slight frictional load at the slackening position. Moreover, in an attempt to prevent degradation in the holding force due to abrasion and deformation of parts caused by a long time use, the adjusting screw 261 may be slackened, and this may be returned to a firmly secured state by simply rotating the adjusting screw 261.

Figure 3:
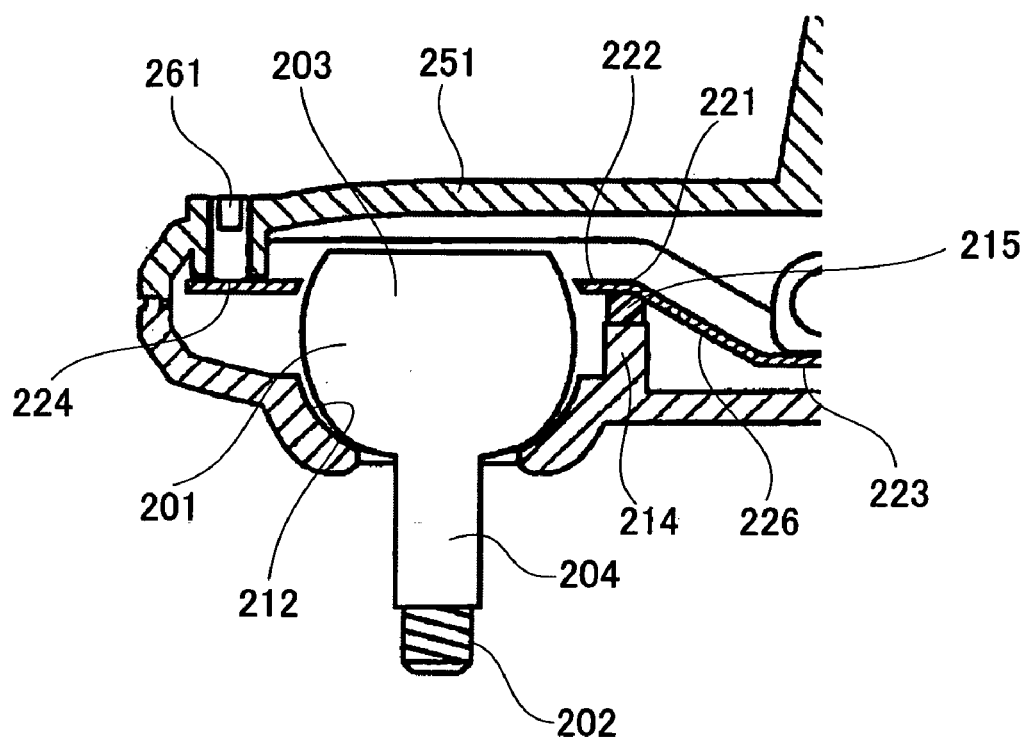
FIG. 3 is a partial enlarged cross-sectional view showing another camera-mounting device in accordance with the first embodiment of the present invention.

FIG. 3 shows another embodiment of the above-mentioned the first embodiment. In this embodiment, a rib 214 is formed on the bottom plate of the case main body 211 near the rear of the ball shaft 201, and an elastic member 215, made of rubber, sponge or the like, is formed at the upper end of this rib 214. This elastic member 215 is allowed to raise the press plate 221 upward so that the ball shaft pressing portion 222 of the press plate 221 is prevented from contacting the ball portion 203 of the ball shaft 201. Here, instead of rubber and sponge, the elastic member 215 may be formed by using a spring.

As shown in FIG. 2, even in a state in which the press plate 221 is not allowed to press the ball shaft 201, that is, the pressing force is set to 0, the ball shaft 201 can be moved. However, the opening edge of the ball shaft pressing portion 222 tends to be meshed with the ball portion 203 of the ball shaft 201 to make it sometimes unmovable smoothly. For this reason, by providing the above-mentioned state in which the press plate 221 is raised by the elastic member 215, a gap is formed between the opening edge of the ball shaft pressing portion 222 and the ball portion 203 of the ball shaft 201 in the slackening position of the lever 242 so that the ball shaft 201 is allowed to move smoothly.

Here, in the case when the lever 242 is pressed downward against the elastic force of the elastic member 215, the ball shaft pressing portion 222 is allowed to press the ball portion 203 of the ball shaft 201 so that the ball shaft 201 is secured in the case main body 211.

Figure 4:
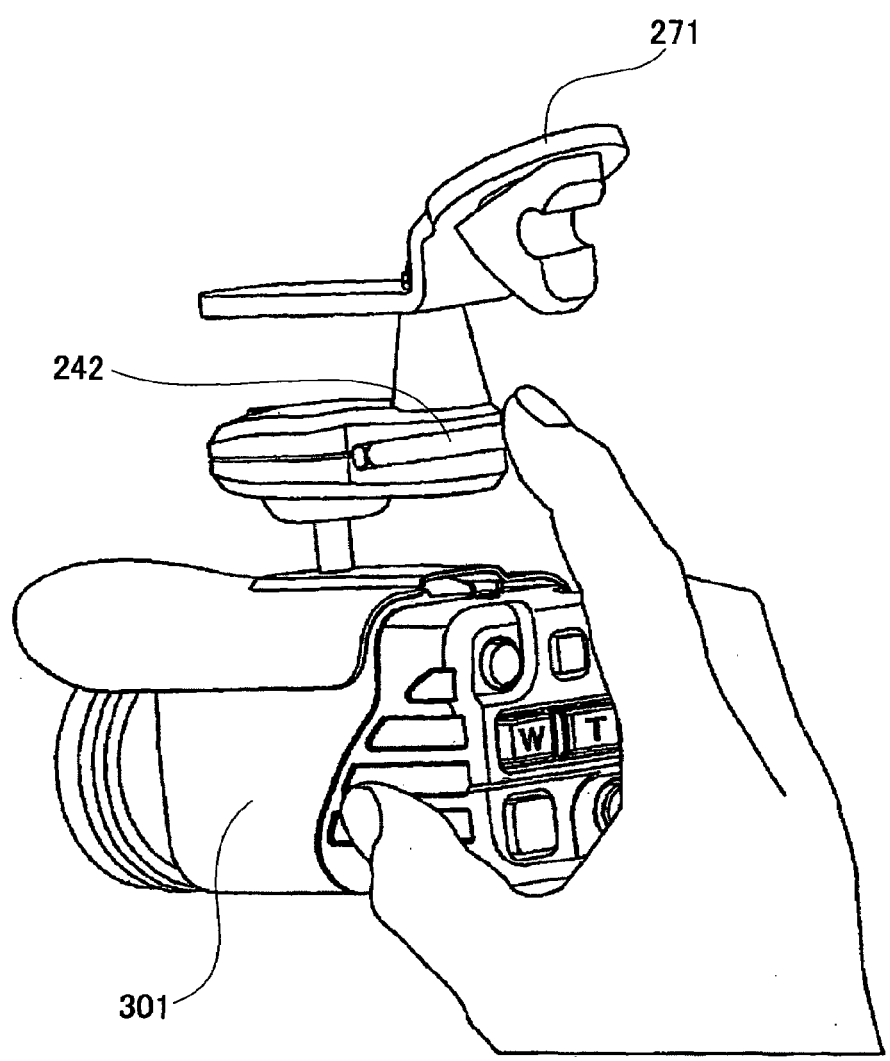
FIG. 4 is a drawing that shows an applied state of the camera-mounting device in accordance with the first embodiment of the present invention.

FIG. 4 is a drawing that shows an applied state in which the lever 242 is being operated, with a monitor camera 301 being attached to a camera screw 202 of the ball shaft 201 of a camera-mounting device in accordance with the first embodiment of the present invention. In general, there are switches for operations, such as zooming of an image and starting of an image recording process, on the back face of a camera used for vehicles. In accordance with the present invention, since the lever operation point can be placed at a position that allows the user to operate the lever 242 by using a second finger upon grabbing the back face of the camera, it becomes possible to achieve a series of operations for aiming at an object, for securing the camera-mounting device and for starting an image pickup only by using one hand.

In FIGS. 1 and 2, the press plate 221 is formed through the single squeezing technique by using a stainless steel plate; however, this may be prepared as a molded product made through an injection molding process such as aluminum die casting, with the same effects, and needless to say, the ball shaft pressing portion 222 may be formed into a cone face or a spherical face with the same effects.

Second Embodiment

Referring to Figures, the following description will discuss a second embodiment of the present invention. In the present embodiment also, the description will be given by exemplifying a camera-mounting device used for securing a monitor camera for vehicles into a vehicle.

Figure 5:
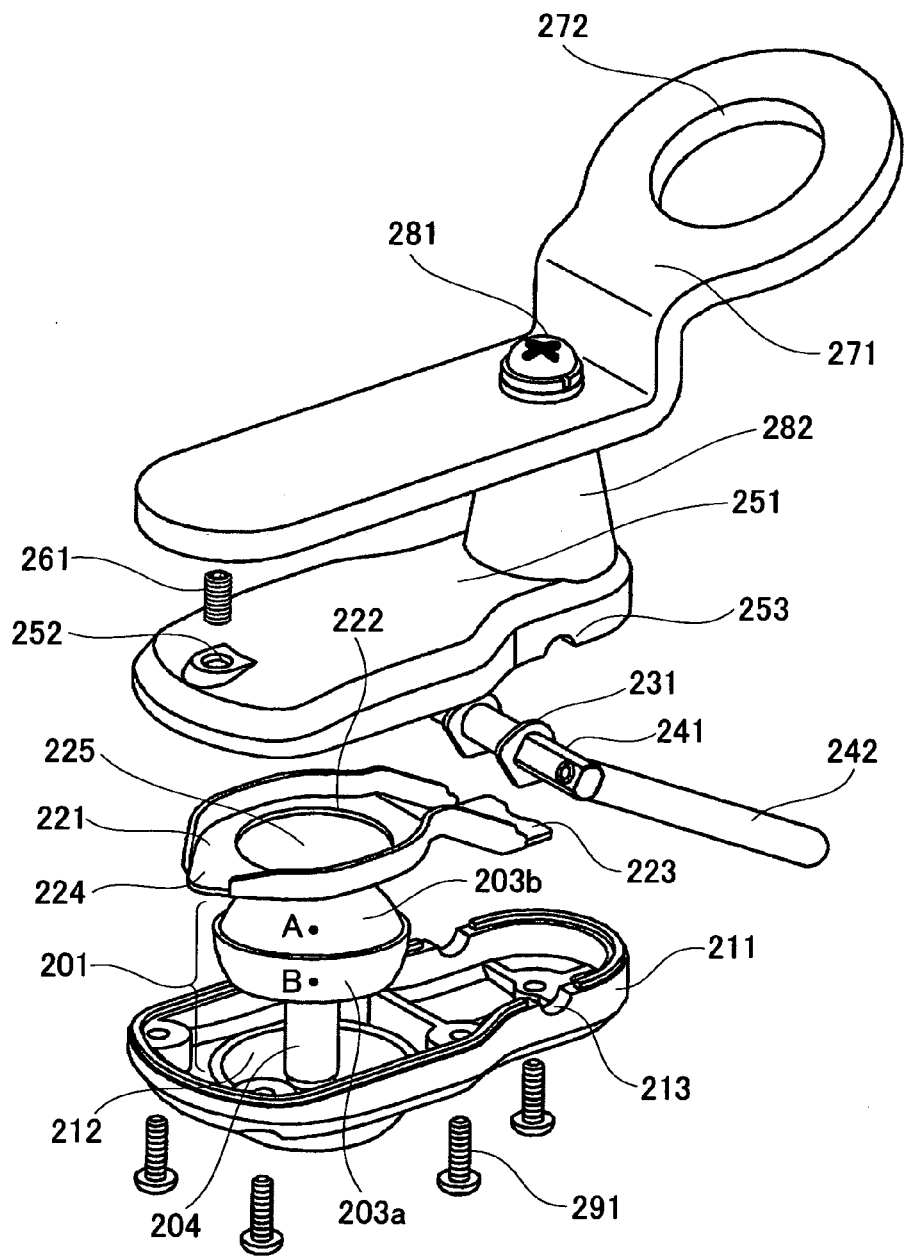
FIG. 5 is a structural drawing that shows parts of a camera-mounting device in accordance with a second embodiment of the present invention.

FIG. 5 is a structural drawing (exploded perspective view) that shows parts of a camera-mounting device in accordance with the embodiment of the present invention. In the camera-mounting device in accordance with the second embodiment, with respect to the casing constituted by a case main body 211 and a lid member 251, the press plate 221 provided with a screw contact point 224, a ball shaft pressing portion 222 and a cam contact face 223, the lever shaft 241 provided with a cam 231 and the lever 242, as well as the attaching member 271, the adjusting screw 261 and the like, the same members as the aforementioned the first embodiment are used; therefore, the same reference numerals are used, and detailed description thereof is omitted.

The present the second embodiment is different from the aforementioned the first embodiment in the ball shaft 201. The ball shaft 201 is constituted by a ball portion 203 and a shaft portion 204, and the ball portion 203 is integrally formed by a lower ball 203*a* centered on a point A and an upper ball 203*b* centered on a point B. Although the upper ball 203*b* and the lower ball 203*a* have virtually the same diameter, the center point A of the lower ball 203*a* and the center point B of the upper ball 203*b* are located on the center axis line of the ball shaft 201, and the center point B is positioned below the center point A. Of course, the upper ball 203*b* and the lower ball 203*a* may have mutually different diameters. Moreover, the distance between the center point A and the center point B may be made wider than that shown in FIG. 1, or may be made narrower than that. Furthermore, the upper and lower positions of the center point A and the center point B may be mutually exchanged.

With respect to the ball shaft 201, the lower ball 203*a* is supported by a ball shaft receiver 212 formed in the case main body 211 so as to pivot thereon, and the ball portion 203 is secured to the case main body 211, with the upper ball 203*b* being pressed from above by the ball shaft pressing portion 222 of the press plate 221.

The following description will discuss the applied state of the above-mentioned structure.

Figure 6:
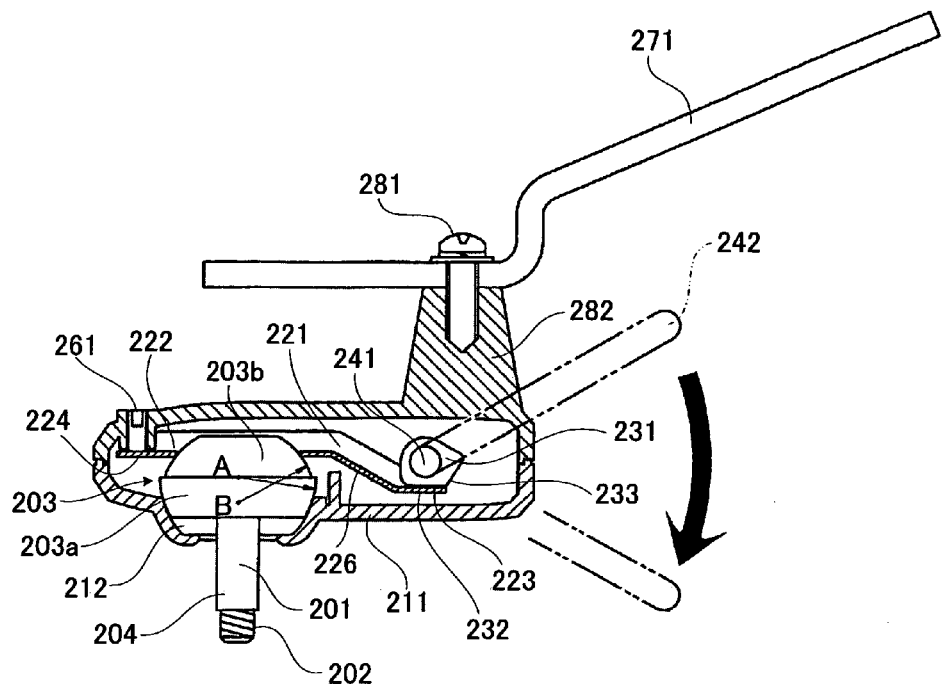
FIG. 6 is a cross-sectional view showing the camera-mounting device in accordance with the second embodiment of the present invention.

In FIG. 6, the cam 231 is located at a slackening position, with the cam 231 being made in contact with the cam contact face 223 at the first flat portion 232. At this time, the press plate 221 is maintained in such a state as not to press the upper ball 203b of the ball shaft 201, that is, a state in which the pressing force is zero. For this reason, since the upper ball 203b is not restrained in its movements by the ball shaft pressing portion 222 of the press plate 221, the ball shaft 201 can be moved. Thus, the camera 301, attached to the shaft portion 204 of the ball shaft 201, is allowed to change its image pickup angle.

Next, when the lever shaft 241 is allowed to pivot from the slackening position shown in FIG. 6 to a tightening position in an arrow direction, the cam 231 is made in contact with the cam contact face 223 at the second flat portion 233. Since the second flat portion 233 is farther from the rotation center of the lever shaft 241 in comparison with the first flat portion 232, the cam 231 is allowed to have a doubled force through the principle of the lever, and presses the cam-contact face 223 of the pressing member 221 downward.

The cam 231 has its cam-contact face 223 made in contact with any one of the flat portions, that is, the first flat portion 232 and the second flat portion 233; therefore, upon contacting at a position other than the slackening position and the tightening position, the cam 231 is pushed back to any one of the positions by a repulsive force of the press plate 221. For this reason, the lever 242 is allowed to be positioned only at the two positions, that is, the slackening position and the tightening position. Moreover, the repulsive force is applied to the cam 231, with the cam contact face 223 being made in contact with the flat portion of the cam 231, so that the layer shaft 241 is restrained in its rotation, and prevented from being slackened by vibrations or the like of the car, which makes this structure different from a simple screw fastening. This feature is the same as that obtained in the aforementioned the first embodiment.

The press plate 221 thus pushed down has its contact point 224 at which it is made in contact with the adjusting screw 261 as a fulcrum, its cam-contact face 223 as a force application point and its ball shaft pressing portion 222 as an action point, and simultaneously as the ball shaft pressing portion 222 presses the upper ball 203b, the lower ball 203a of the ball shaft 201 is pressed onto the ball shaft receiver 212 so that the ball shaft 201 is firmly secured to the case main body 211. In the present embodiment, by using a multiplied force of 1.8 times in the pressing member as well as by using a multiplied force of 9.3 times in the lever 242 and the cam 231, so that a multiplied force of 16.7 times in total is used to carry out a securing process; thus, by using a light operation of the lever 242, the ball shaft 201 is firmly secured to the case main body 211. In this manner, the camera-mounting device of the present invention makes it possible to carry out slackening and tightening operations of the ball shaft by switching the slackening position and the tightening position of the lever.

Additionally, by adjusting the upward and downward positions of the adjusting screw 261 so that the position at which the adjusting screw 261 is made in contact with the screw contact point 224 is changed, the position of the fulcrum is changed, and the securing force to be exerted upon placing the lever 242 at the tightening position can be adjusted.

Figure 7A:
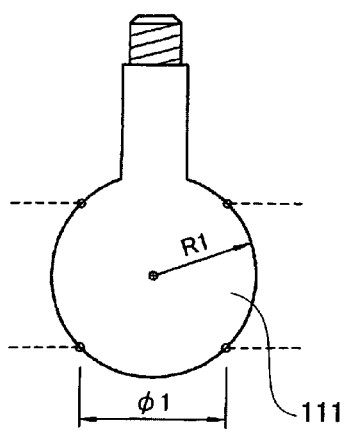
FIG. 7A and FIG. 7B each is an explanatory drawing that indicates stresses applied to a ball shaft.
Figure 7B:
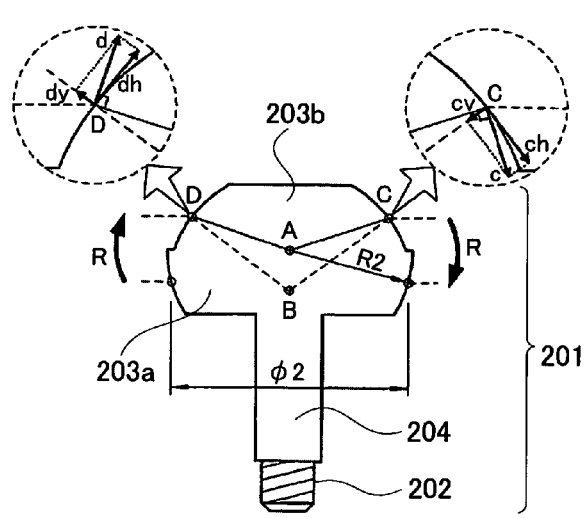
Figure 9:
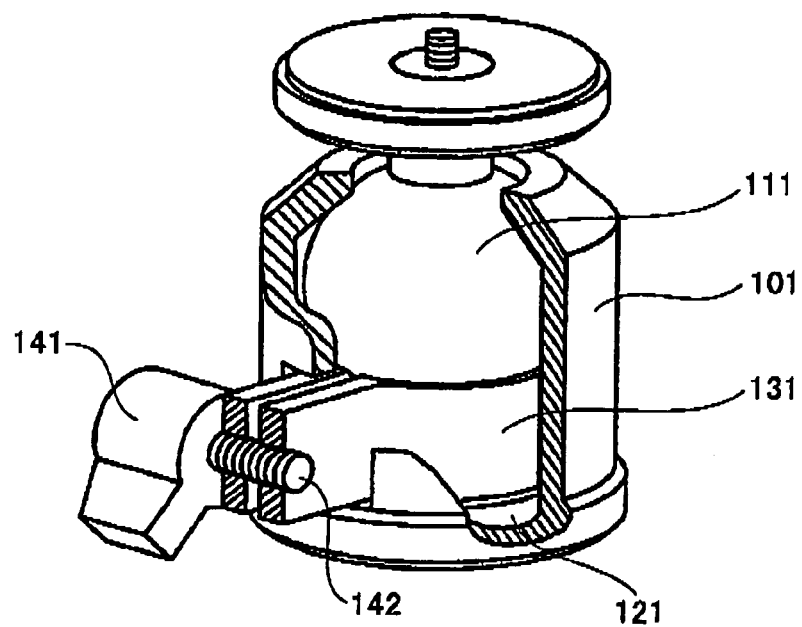
FIG. 9 is an exploded cross-sectional view showing one portion of a conventional camera-mounting device.
Figure 10:
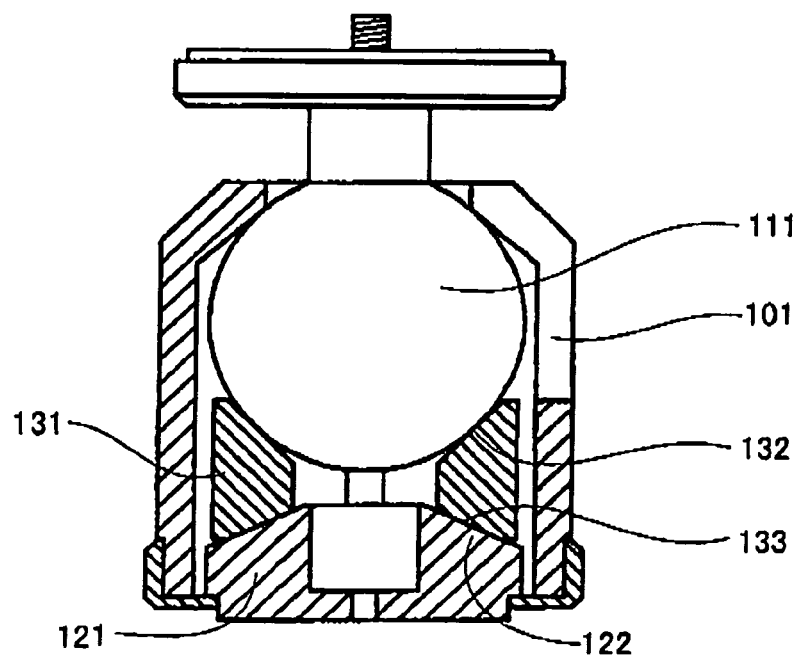
FIG. 10 is a cross-sectional view showing the conventional camera-mounting device.

Referring to FIGS. 7A and 7B, the following description will discuss the functions and effects of the ball shaft 201 having the ball portion 203 constituted by the lower ball 203a and the upper ball 203b with mutually different center positions as described above. FIGS. 7A and 7B are explanatory drawings for stresses, which indicate comparisons between the securing methods of a conventional ball shaft and the ball shaft of the present invention. Since the ball portion of the conventional ball shaft 111 has a complete spherical shape, the contact points between the ball portion and a mount base 121 as well as between the ball portion and the case main body 101 (see FIGS. 9 and 10, only contact lines are indicated by broken lines) are located on a circle having a diameter of φ1 (which is actually a spherical face, but indicated as a circle shown in FIG. 7A for convenience of explanation). In the same manner as other portions on the surface of the ball portion, this circle is positioned with a radius R1 from the center of the ball portion. Therefore, in response to rotation of the ball portion of the ball shaft 111, this point is always located on the circle. In contrast, supposing that the point is rotated around the center point of the ball portion, the point on the circle is moved along the circle of the ball shaft 111, with the result that no mechanically restraining force is exerted thereon except for friction. Consequently, the rotation moment, applied onto a camera screw, has been restrained only by friction caused by materials at the two contact portions having the diameter of φ1.

In contrast, with respect to the ball shaft 201 of the present invention, supposing that the ball shaft 201 is rotated in a direction of an arrow R centered on the point A, the lower ball 203a centered on the point A is restrained only by friction with respect to the arc portion of the ball shaft receiver 212 (not shown in FIG. 7B, only contact lines are indicated by broken lines) in the same manner as the conventional ball shaft 111. On the other hand, the center point of the upper ball 203b corresponds to point B that is a position different from that of the point A so that, since the contact circle between the upper ball 203b and the ball shaft pressing portion 222 of the press plate 221 (not shown in FIG. 7B, only contact lines are indicated by broken lines) is not present on the spherical face centered on the point A, at the contact point of FIG. 7B, a vector of a force is generated in a pressing direction on the ball shaft pressing portion 222 due to a rotation moment applied to the camera screw 202.

As shown in the partially enlarged drawing of FIG. 7B, a contact point C is moved in a direction of a vector c by the rotation of the upper ball 203b in the direction of the arrow R. When the vector c is divided into two vectors in the contact face direction and in a direction perpendicular thereto at the point C, respective vectors ch and cv are formed. Since the vector ch is a vector in the contact face direction of the upper ball 203b, no pressing force is generated onto the ball shaft pressing portion 222. Moreover, since the vector cv is also a vector in a departing direction from the ball shaft pressing portion 222, no pressing force is generated in the same manner. In other words, at the contact point C, the ball shaft pressing portion 222 does not intervene with the rotation of the upper ball 203b.

On the other hand, a contact point D is moved in a direction of a vector d by the rotation of the upper ball 203b in the direction of the arrow R. When the vector d is divided into two vectors in the contact face direction and in a direction perpendicular thereto at the point D, respective vectors dh and dv are formed. Since the vector dh is a vector in the contact face direction of the upper ball 203b, no pressing force is generated onto the ball shaft pressing portion 222. However, since the vector dv is a vector in an approaching direction toward the ball shaft pressing portion 222, a pressing force is generated.

Since this vector dv is exerted in such a direction as to make the upper ball 203b of the ball shaft 201 meshed with the ball shaft pressing portion 222, the rotation moment, applied to the camera screw 202, is mechanically restrained in its rotation by the contact circle between the upper ball 203b and the ball shaft pressing portion 222 of the press plate 221 so that a firm securing operation is achieved. This effect can be easily verified by the fact that, even when oil or the like is applied to the ball portion 203 of the ball shaft 201 to reduce a frictional force, the rotation of the ball shaft 201 is restrained.

Here, in FIG. 6, the spherical centers of the lower ball 203a and the upper ball 203b are formed at positions at which straight lines extending toward the circumferences of the upper ball 203b and the lower ball 203a from points A and B are made to mutually intersect with each other; however, not limited to this structure, it is only necessary for the mutual centers not to be located at the same position, and needless to say, for example, a ball shaft having two balls whose spherical centers are separated from each other may be used with the same effects.

Figure 8:
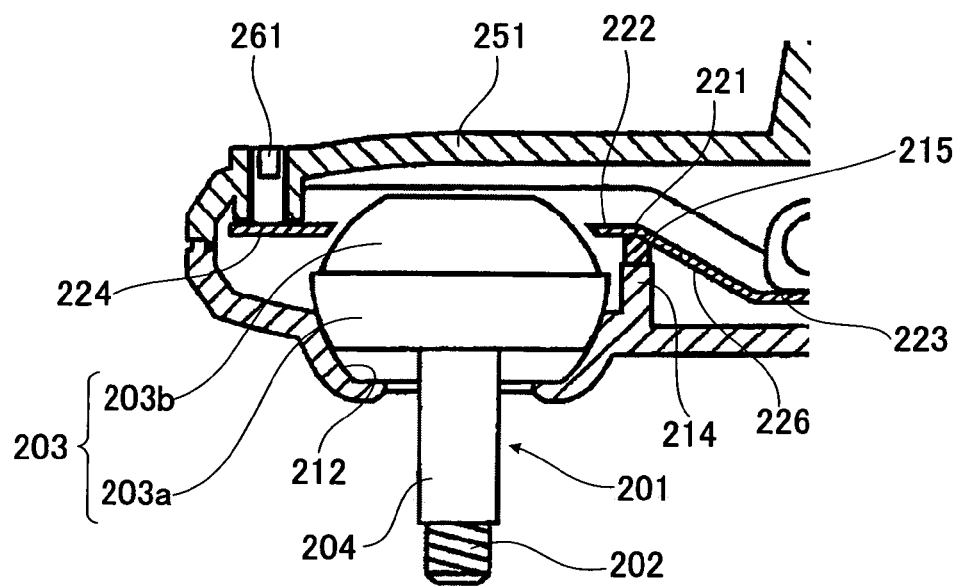
FIG. 8 is a partial enlarged cross-sectional view showing another camera-mounting device in accordance with the second embodiment of the present invention.

FIG. 8 shows another embodiment relating to the above-mentioned the second embodiment. In this embodiment also, a rib 214 is formed on the bottom of the case main body, and an elastic member 215 is attached to the upper end of the rib 214. Here, in this case also, instead of rubber and sponge, a spring may be used for the elastic member 215. In the same manner as the other embodiment relating to the aforementioned the first embodiment, the elastic member 215 also raises the press plate 221 upward so that the opening edge of the ball shaft pressing portion 222 of the press plate 221 is prevented from contacting with the upper ball 203b of the ball shaft. Thus, the ball shaft 201 is allowed to move smoothly.

In accordance with the camera-mounting device of the present invention, it becomes possible to achieve a firm securing operation that is resistive to vibration by using inexpensive parts, and also to allow one-hand operations; thus, the resulting device is effectively used as a camera-mounting device to be attached to mobile objects such as vehicles, which is free from degradation in the securing force due to vibration.

What is claimed is:

1. A camera-mounting device comprising:
a ball shaft having a ball portion and a shaft portion;
a case main body provided with a ball-shaft receiver that holds the ball portion of the ball shaft;
a press plate that allows the ball shaft to be pressed onto the ball-shaft receiver; and
a cam for pressing the press plate in a direction toward the ball shaft by a rotation of a lever, wherein
the cam has a first flat portion and a second flat portion that has a distance longer from the rotation center of the cam in comparison with the first flat portion,
when the first flat portion of the cam is allowed to press the press plate through the rotation of the lever, the press plate is not allowed to press the ball shaft, and
when the second flat portion of the cam is allowed to press the press plate through the rotation of the lever, the press plate is allowed to press the ball shaft so that the ball shaft is sandwiched between the ball-shaft receiver and the press plate to be secured between them.

2. The camera-mounting device according to claim 1, further comprising an adjusting screw that variably changes the position of the press plate used for pressing the ball shaft.

3. The camera-mounting device according to claim 1, wherein a camera is secured to the shaft portion, and the lever is placed at a position at which, when a user grabs the back face of the camera, the user is allowed to operate the operation point of the lever by a second finger.

4. The camera-mounting device according to claim 1, wherein the ball portion of the ball shaft is constituted by an upper ball and a lower ball having mutually different center positions from each other.

5. The camera-mounting device according to claim 1, further comprising an elastic member that presses the press plate in such a direction as to be separated from the ball portion of the ball shaft.

* * * * *